(12) United States Patent
Nakauchi

(10) Patent No.: US 9,719,773 B2
(45) Date of Patent: Aug. 1, 2017

(54) MEASURING METHOD AND MEASURING APPARATUS

(75) Inventor: Akihiro Nakauchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1800 days.

(21) Appl. No.: 12/944,187

(22) Filed: Nov. 11, 2010

(65) Prior Publication Data

US 2011/0112785 A1    May 12, 2011

(30) Foreign Application Priority Data

Nov. 12, 2009 (JP) ................... 2009-259309
Oct. 28, 2010 (JP) ................... 2010-242653

(51) Int. Cl.
 *G01B 9/02* (2006.01)
 *G01B 11/24* (2006.01)

(52) U.S. Cl.
 CPC ..... *G01B 9/02083* (2013.01); *G01B 9/02057* (2013.01); *G01B 11/2441* (2013.01)

(58) Field of Classification Search
 USPC ............. 702/85, 90, 190, 193; 356/600, 601
 See application file for complete search history.

(56) References Cited

U.S. PATENT DOCUMENTS

| | | | |
|---|---|---|---|
| 6,184,994 B1 * | 2/2001 | Freischlad | 356/511 |
| 6,956,657 B2 | 10/2005 | Golini et al. | |
| 7,324,214 B2 * | 1/2008 | De Groot et al. | 356/511 |
| 7,324,904 B2 | 1/2008 | Floyd et al. | |
| 7,630,006 B2 | 12/2009 | DeLuca et al. | |
| 8,108,119 B2 | 1/2012 | Southall et al. | |
| 8,169,620 B1 * | 5/2012 | Stahl | G01B 11/2441 |
| | | | 356/513 |
| 8,212,227 B2 | 7/2012 | Watanabe et al. | |

(Continued)

FOREIGN PATENT DOCUMENTS

JP  02-259509 A  10/1990
JP  11-14322 A   1/1999

(Continued)

OTHER PUBLICATIONS

Mercier, R. et. al., "Two-flat method for bi-dimensional measurement of absolute departure from the best sphere", Pure Appl. Opt., 6 (1997), pp. 117-126, Oct. 4, 1996.

(Continued)

*Primary Examiner* — Mohamed Charioui
(74) *Attorney, Agent, or Firm* — Rossi, Kimms & McDowell LLP (57) ABSTRACT

The present invention provides a method of measuring a shape of a surface of an object, the method including obtaining shape data for each of a plurality of regions on the surface by a surface measurement for each of the plurality of regions, each of the plurality of regions having a region overlapping another of the plurality of regions, obtaining an error of the surface measurements so as to minimize a difference in shape with respect to the overlapping regions based on the obtained shape data, and obtaining the shape of the surface based on the obtained shape data and the obtained error, wherein the shape data is obtained so as not to include a component having a spatial frequency higher than a threshold determined based on a required precision.

20 Claims, 5 Drawing Sheets

(56) References Cited

U.S. PATENT DOCUMENTS

| 8,284,393 | B2 | 10/2012 | Takahashi et al. | |
|---|---|---|---|---|
| 2003/0117632 | A1* | 6/2003 | Golini | G01B 11/255 356/512 |
| 2009/0296101 | A1* | 12/2009 | Oshima et al. | 356/512 |
| 2009/0306931 | A1* | 12/2009 | Negishi | 702/167 |

FOREIGN PATENT DOCUMENTS

| JP | 2001-066123 A | 3/2001 |
|---|---|---|
| JP | 2002-181517 A | 6/2002 |
| JP | 2004-286561 A | 10/2004 |
| JP | 2008-241506 A | 10/2008 |

OTHER PUBLICATIONS

Nakauchi, Akihiro. "Calculation Method and Calculation Apparatus," Specification and Drawings of unpublished related co-pending U.S. Appl. No. 12/904,501, filed Oct. 14, 2010, pp. 1-30.
Japanese Office Action for JP 2009-238659, dated Aug. 30, 2013.
Japanese Office Action for JP 2010-242653, mail date Mar. 14, 2014.

* cited by examiner

MEASURING METHOD AND MEASURING APPARATUS

BACKGROUND OF THE INVENTION

Field of the Invention

The present invention relates to a measuring method and measuring apparatus.

Description of the Related Art

A stitching method or synthetic aperture method using an interferometer is known as a method of measuring the surface shape (planar shape) of an optical element such as a large-diameter mirror or lens. In the stitching method using an interferometer, it is important to separate the system error of the interferometer from the surface shape of the target surface (R. Mercier et. al., "Two-flat method for bi-dimensional measurement of absolute departure from the best sphere", Appl. Opt., 6 (1997), 117 ("Reference 1"). Reference 1 discloses a technique of measuring the surface shape of a target surface while relatively shifting the target surface and the reference surface, and separating a system error from the surface shape of the target surface based on measured values at portions where the measured values before and after the shift overlap.

U.S. Pat. No. 6,956,657 discloses a technique of measuring the surface shapes of a plurality of regions (sub-aperture regions) each smaller than the whole target surface and combining the measured values of the plurality of regions, thereby obtaining the surface shape of the target surface. Note that in U.S. Pat. No. 6,956,657, the system error is separated from the target surface shape based on measured values of portions where the plurality of regions overlap, as in Reference 1. More specifically, the measured value of the jth region is represented by the sum of three elements, that is, the surface shape of the target surface, the alignment error between the interferometer and the target surface, and the system error. Then, the alignment error and the system error are obtained by the least squares method such that the difference between the measured values of portions where adjacent regions overlap is minimized.

Note that in the conventional techniques of Reference 1 and U.S. Pat. No. 6,956,657, the system error is expressed by the sum of polynomials such as Zernike polynomials or trigonometric functions.

However, since the conventional techniques use the stitching method that inputs the measured value of each of the plurality of regions of the target surface, an error is generated in the surface shape of the target surface to be measured due to restrictions on the number of terms to be used in polynomials for expressing the system error. That is, since a system error that cannot be expressed by the number of terms to be used in polynomials remains as an error, the precision of measuring the surface shape of the target surface is reduced.

This problem can be avoided by sufficiently increasing the number of terms of polynomials for expressing the system error. In general, however, if the number of terms of polynomials that are fitting variables is increased, the matrix to be used in the least squares method becomes large. This leads to a longer calculation time or a shortage of computer memory capacity. Hence, with the conventional techniques, the number of terms to be used in polynomials for expressing a system error must be limited, and it is therefore difficult to obtain a sufficient measurement precision.

SUMMARY OF THE INVENTION

The present invention provides a measuring apparatus and measuring method advantageous in terms of precision of measuring a surface shape of an object.

According to one aspect of the present invention, there is provided a method of measuring a shape of a surface of an object, the method including obtaining shape data for each of a plurality of regions on the surface by a surface measurement for each of the plurality of regions, each of the plurality of regions having a region overlapping another of the plurality of regions, obtaining an error of the surface measurements so as to minimize a difference in shape with respect to the overlapping regions based on the obtained shape data, and obtaining the shape of the surface based on the obtained shape data and the obtained error, wherein the shape data is obtained so as not to include a component having a spatial frequency higher than a threshold determined based on a required precision.

Further aspects of the present invention will become apparent from the following description of exemplary embodiments with reference to the attached drawings.

DESCRIPTION OF THE EMBODIMENTS

Preferred embodiments of the present invention will be described below with reference to the accompanying drawings. Note that the same reference numerals denote the same members throughout the drawings, and a repetitive description thereof will not be given.

Figure 1:
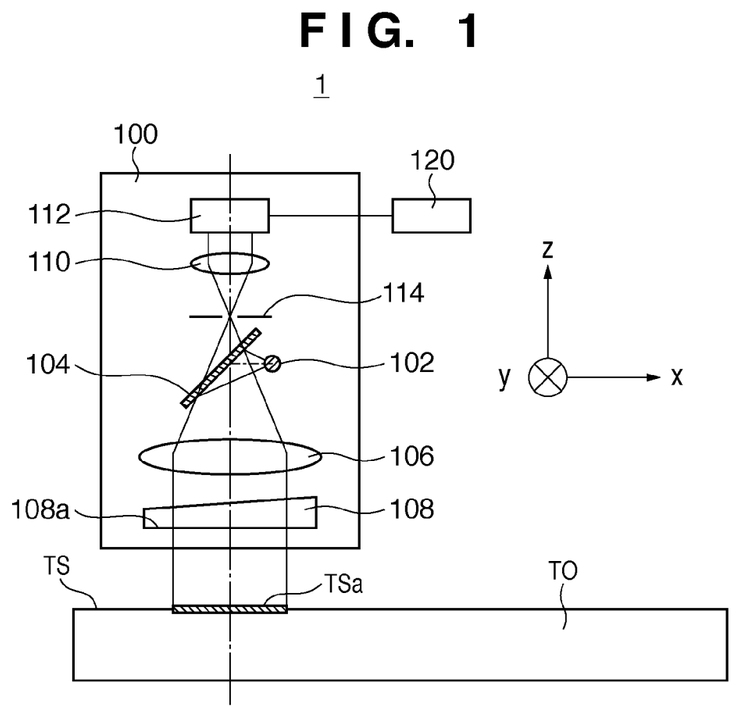
FIG. 1 is a view showing the arrangement of a measuring apparatus according to an aspect of the present invention.

FIG. 1 is a view showing the arrangement of a measuring apparatus 1 according to an aspect of the present invention. The measuring apparatus 1 fundamentally has the structure of a Fizeau interferometer, and measures the surface shape of a target surface TS of a target object TO. Note that the target surface TS of the target object TO is assumed to be planar in this embodiment.

The measuring apparatus 1 of this embodiment includes a measuring unit 100 including a light source 102, half mirror 104, collimator lens 106, TF lens 108 with a reference surface 108a, imaging lens 110, image sensor 112, and aperture filter 114, and a processing unit 120. Note that "TF" of the TF lens stands for "Transmission Flat".

Light (divergent light) emitted by the light source 102 is reflected by the half mirror 104 so as to become incident on the collimator lens 106. The light that has entered the collimator lens 106 is converted into a parallel beam and input to the TF lens 108.

Some components of the light input to the TF lens 108 are reflected (vertically reflected) by the reference surface 108a so as to return through almost the same optical path in the TF lens 108 and the collimator lens 106 and enter the half mirror 104. Note that the light reflected by the reference surface 108a of the TF lens 108 will be referred to as reference light hereinafter.

On the other hand, the light transmitted through the reference surface 108a of the TF lens 108 is reflected (vertically reflected) by the target surface TS so as to return through almost the same optical path in the TF lens 108 and the collimator lens 106 and enter the half mirror 104. Note that the light reflected by the target surface TS will be referred to as measurement light hereinafter.

The reference light reflected by the reference surface 108a and the measurement light reflected by the target surface TS are transmitted through the half mirror 104, and then pass through (the aperture of) the aperture filter 114. To prevent aliasing in the image sensor 112, the aperture of the aperture filter 114 is set to a diameter that cuts a high-frequency component. The reference light and measurement light which have passed through the aperture filter 114 enter the image sensor 112 formed from a CCD or the like via the imaging lens 110. The image sensor 112 detects an interference pattern (interference fringes) formed by the reference light and measurement light.

The interference pattern detected by the image sensor 112 is sent to the processing unit 120. The processing unit 120 performs processing for obtaining the height (surface shape) of the target surface TS based on the interference pattern from the image sensor 112, as will be described later.

To measure the surface shape of the entire target surface TS, the measuring apparatus 1 of this embodiment performs measurement by sequentially setting, as a measurement target region TSa, each of a plurality of regions obtained by dividing the entire target surface TS such that at least adjacent regions overlap each other. For example, the measuring apparatus 1 measures the measurement target region TSa while driving the measuring unit 100 in the x-y plane relative to the target surface TS so that the measurement target region TSa can cover the entire target surface TS. Instead of driving the measuring unit 100, the target surface TS may be driven relative to the measuring unit 100. Note that any arrangement well known to those skilled in the art is applicable as the driving mechanism for driving the measuring unit 100 (or target surface TS).

When driving the measuring unit 100 (or target surface TS), alignment needs to be performed to minimize the alignment error or orientation error between the measuring unit 100 and the target surface TS (measurement target region TSa). More specifically, alignment is performed such that the backward path of the measurement light reflected by the target surface TS (measurement target region TSa) becomes almost the same as the forward path. Note that any arrangement well known to those skilled in the art is applicable as the alignment mechanism for aligning the measuring unit 100 with the target surface TS.

Figure 2:
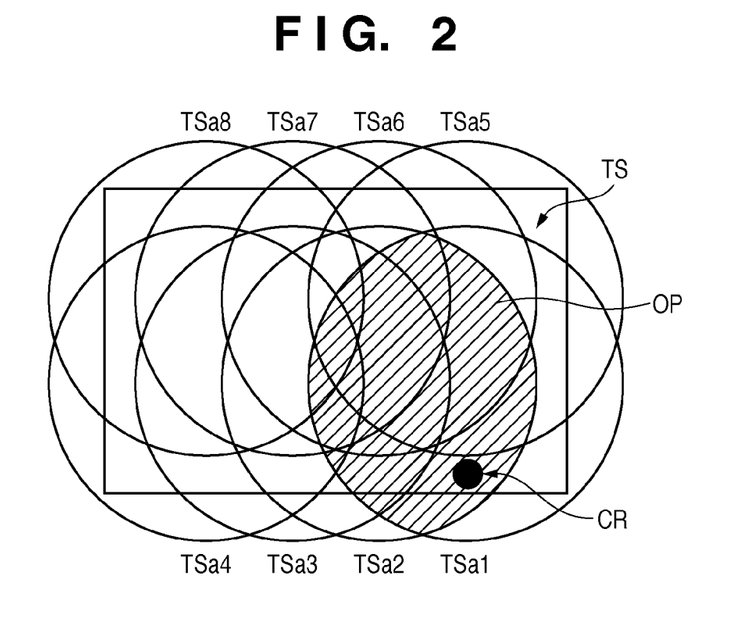
FIG. 2 is a view showing the relationship between a target surface and a measurement target region in the measuring apparatus shown in FIG. 1.

FIG. 2 is a view showing the relationship between the target surface TS and the measurement target region TSa. In this embodiment, as shown in FIG. 2, the target surface TS is a rectangular region, and the measurement target region TSa measurable by the measuring apparatus 1 in one process is a circular region (measurement target regions TSa1 to TSa8). Note that as described above, the measurement target regions TSa1 to TSa8 are set such that at least adjacent regions overlap each other. In FIG. 2, the eight (2 rows×4 columns) measurement target regions TSa1 to TSa8 are set to cover the entire target surface TS. In FIG. 2, a portion OP where the measurement target regions TSa1 and TSa2 overlap is hatched.

Measurement of the surface shape of the target surface TS by the measuring apparatus 1 will be described below with reference to FIG. 3. Note that processing executed by the processing unit 120, that is, processing for obtaining the surface shape of the target surface TS based on measurement results in the measurement target regions will now be explained in detail.

In step S302, the height of the target surface TS in each of the plurality of measurement target regions is measured. More specifically, each of the plurality of regions obtained by dividing the entire target surface TS such that at least adjacent regions overlap each other is sequentially set as the measurement target region TSa. The image sensor 112 detects an interference pattern formed by measurement light reflected by the measurement target region TSa and reference light reflected by the reference surface 108a, thereby measuring the heights of the target surface TS at a plurality of positions in the measurement target region TSa. In this embodiment, the entire target surface TS is divided into the eight measurement target regions TSa1 to TSa8, as shown in FIG. 2. In this case, in step S302, data that give heights at a plurality of positions in the measurement target regions TSa1 to TSa8 are obtained as measurement results $F_i(x,y)$ in the measurement target regions TSa1 to TSa8. Note that the suffix i represents each measurement target region, which takes values 1 to 8 in this embodiment, and $(x,y)$ represents coordinates on the target surface.

The coordinates of the measurement results $F_i(x,y)$ are converted from coordinates on the detection plane of the image sensor 112 for detecting the interference pattern into coordinates on the target surface based on the optical magnification and distortion of the measuring apparatus 1, and the relative positional relationship between the measuring unit 100 and the target surface TS in measuring each measurement target region. If the target surface TS is a spherical surface or aspherical surface, complex coordinate conversion is necessary. Generally, to convert the coordinate system on the detection plane of the image sensor 112 into the rectangular coordinate system on which the target surface TS is arranged, two points need to be taken into consideration. First, spherical waves from the measuring apparatus 1 (interferometer) generally form a coordinate system in which the number of apertures of the optical system is uniform. Second, the measurement target region TSa is driven not in the x-y plane but along the target surface TS.

In step S304, correction data $M_i(x,y)$ is generated by performing low-pass filter processing for the measurement results $F_i(x,y)$ in the measurement target regions TSa1 to TSa8. Note that the cutoff frequency of the low-pass filter processing is defied as fL. The cutoff frequency fL is determined within a frequency range including information (height information) about a target surface necessary in each of the measurement target regions TSa1 to TSa8, as will be described later. Hence, the correction data can be regarded as data obtained by removing height information of a high-frequency component out of height information included in the data that give the heights at the plurality of positions in the measurement target regions TSa1 to TSa8.

Note that an example of the low-pass filter processing is processing for Fourier-transforming the measurement results Fi(x,y) in the measurement target regions TSa1 to TSa8 and filtering to extract only a band necessary in the Fourier space. It may be processing for preparing a real space filter and performing a convolution operation of the measurement results Fi(x,y) in the measurement target regions TSa1 to TSa8. Alternatively, the low-pass filter processing may be processing for fitting Zernike polynomials to the measurement results Fi(x,y) in the measurement target regions TSa1 to TSa8 and extracting lower-order components up to the JKth term of the Zernike polynomials. The value of the cutoff frequency fL may be changed in accordance with the orientation in the x-y plane. Note that setting of the cutoff frequency fL of the low-pass filter processing will be described later.

The correction data generated in step S304 is obtained by removing the system error (higher-order component) of the measuring apparatus 1 from the measurement result in each measurement target region, as will be described later. Hence, using the correction data in the stitching method allows the surface shape of the target surface TS to be obtained accurately.

In steps S306 and S308, using the correction data for each of the plurality of measurement target regions generated in step S304 in place of the measurement result Fi(x,y) in each measurement target region, the surface shape of the target surface TS is obtained by the stitching method.

More specifically, in step S306, the alignment error and system error are separated from the correction data Mi(x,y) generated in step S304. First, let AEi be the alignment error that is the relative orientation component between the measuring unit 100 and the target surface TS when measuring the ith measurement target region, and SE be the system error, which has the same value in all measurement target regions. Using the correction data Mi(x,y), a surface shape Pi of the target surface TS in the ith measurement target region is represented by $$Pi(x,y)=Mi(x,y)-AEi(x-xi,y-yi)-SE(x-xi,y-yi) \qquad (1)$$

Using equation (1), a merit function D is defined by $$D=\text{Sum1}[((Mi(x,y)-Mj(x,y))-(AEi(x-xi,y-yi)-AEj(x-xj,y-yj))-(SE(x-xi,y-yi)-SE(x-xj,y-yj)))^2] \qquad (2)$$

The merit function D is a function representing the square of the difference between the surface shape Pi of the target surface TS in the ith measurement target region and a surface shape Pj of the target surface TS in the jth measurement target region at the overlap portion.

Sum1[ ] in equation (2) is a function that expresses sums concerning all combinations of two measurement target regions selected from N measurement target regions, and sums concerning the coordinates (x,y) on the target surface. An effective one of the sums concerning the coordinates (x,y) on the target surface corresponds to the overlap portion of the ith and jth measurement target regions. For example, in FIG. 2, it is the sum of the portion OP where the measurement target regions TSa1 and TSa2 overlap.

The targets to be obtained are the alignment error AEi and system error SE which minimize the merit function D represented by equation (2). The alignment error AEi is given by $$AEi(x,y)=a1i+a2i \cdot x+a3i \cdot y \qquad (3)$$

The system error SE is given by $$SE(x,y)=\text{Sum2}[aj \cdot fj(x,y)] \qquad (4)$$

As described above, the alignment error AEi is a component generated by the orientation error between the measuring unit 100 and the target surface TS. If the target surface TS is planar, the alignment error AEi is the sum of a piston component and tilt components. That is, in equation (3), a1i is the piston component when measuring the ith measurement target region, and a2i and a3i are the tilt components when measuring the ith measurement target region. Note that if the target surface TS is a spherical surface, a power component is included in the alignment error AEi represented by equation (3).

In equation (4), fj(x,y) represents polynomials of degree j. Generally, Zernike polynomials or trigonometric functions are used. Sum2[ ] represents the sum for the degree j of the polynomials, and aj is the amplitude of the jth polynomial.

Let J be the maximum degree of the polynomials. Note that the maximum degree J includes the cutoff frequency of low-pass filter processing, as will be described later. The sum of the polynomials fj(x,y) does not include the same component as the alignment error AEi.

Equations (3) and (4) are substituted into equation (2), and the variables a1i, a2i, a3i, and aj are obtained using, for example, the least squares method such that the merit function D is minimized. The maximum degree J of the polynomials for expressing the system error is determined in consideration of restrictions on the calculation time, the memory capacity of the computer, and the like. For example, if Fringe Zernike polynomials are used, J=36 is appropriate. A state-of-the-art computer can obtain the variables within a realistic calculation time and memory capacity up to J=169.

The thus obtained variables a1i, a2i, a3i, and aj are substituted into equations (3) and (4). Data Mi'(x,y) is obtained by separating the alignment error AEi and the system error SE from the correction data Mi(x,y) in accordance with $$Mi'(x,y)=Mi(x,y)-AEi(x-xi,y-yi)-SE(x-xi,y-yi) \qquad (5)$$

In step S308, the data Mi'(x,y) obtained in step S306 are combined to obtain the surface shape of the entire target surface TS. More specifically, a surface shape P(x,y) of the entire target surface TS is obtained by $$P(x,y)=\text{Sum0}[Mi'(x,y)/\text{Count}(x,y),\{i=1,N\}] \qquad (6)$$

where Sum0[ ] represents the sum of all measurement target regions, and Count(x,y) represents the number of measurement target regions including the coordinates (x,y) on the target surface. For example, since coordinates CR shown in FIG. 2 are included in the measurement target regions TSa1 and TSa2, Count(x,y)=2.

The cutoff frequency fL of the low-pass filter processing in step S304 and the maximum degree J of the polynomials for expressing the system error in step S306 will now be described. FIG. 4 is a graph schematically showing the surface shape of the target surface TS. In FIG. 4, the abscissa adopts a spatial frequency f, and the ordinate adopts a frequency component PSD of the surface shape of the target surface TS. In FIG. 4, Pj represents the surface shape of the target surface TS, and SysE represents the system error of the measuring apparatus 1. The cutoff frequency fL of the low-pass filter processing is determined such that the difference between the surface shape of the target surface before the low-pass filter processing and that after the low-pass filter processing falls within a tolerance. In low-pass filter processing using Zernike polynomials, the degree (number of terms) to be fitted is determined regarding the abscissa of FIG. 4 as the degree of the Zernike polynomials. Note that FIG. 4 assumes only a one-dimensional frequency component as the surface shape of the target surface TS. In actuality, the cutoff frequency of the low-pass filter processing is two-dimensionally determined by obtaining two-dimensional frequency components.

The maximum degree J of the polynomials for expressing the system error is determined so as to express the surface shape of the target surface (that is, the correction data generated in step S304) after the low-pass filter processing. For example, in low-pass filter processing using spatial frequencies, when the system error of the measuring apparatus 1 is to be expressed by the sum of trigonometric functions, kxj and kyj are defined as the spatial frequencies in the x- and y-axis directions, respectively. In this case, the trigonometric functions for expressing the system error of the measuring apparatus 1 are represented by $\cos(kxj \cdot x)$, $\sin(kxj \cdot x)$ and $\cos(kyj \cdot y)$, $\sin(kyj \cdot y)$ concerning the x- and y-axis directions. The root sum square of the spatial frequencies kxj and kyj in the x- and y-axis directions corresponding to the maximum degree J is set to be greater than or equal to the cutoff frequency fL. Alternatively, each of the spatial frequencies kxj and kyj may be set to be greater than or equal to the cutoff frequency fL. Note that when Zernike polynomials are used, the degree of polynomials used in step S304 is set to be less than or equal to the degree of polynomials for expressing the system error to be used in step S306 (that is, less than or equal to a frequency corresponding to the degree).

More specifically, the cutoff frequency fL of the low-pass filter processing is determined in accordance with the surface shape of the target surface TS (measurement target region TSa). Although the surface shape of the target surface TS is unknown before actual measurement, the cutoff frequency fL can be determined using the following three methods.

The first method uses the surface standards of the surface shape of the target surface TS. When the cutoff frequency fL is set to be greater than or equal to the maximum value of the spatial frequency band that defines the surface standards of the surface shape of the target surface TS, the surface shape of the target surface TS can accurately be measured.

The second method uses the process characteristics of the polisher and grinder used to process the target surface TS. More specifically, by using the spatial frequency characteristics of the process characteristics of the polisher and grinder used to process the target surface TS, the cutoff frequency fL is set to be greater than or equal to the spatial frequency at which the process sensitivity for the surface shape of the target surface TS becomes low.

In the third method, the surface shape (temporary surface shape) of the target surface TS is obtained by the conventional stitching method (that is, without executing the low-pass filter processing), and the cutoff frequency fL is determined based on the temporary surface shape.

Figure 3:
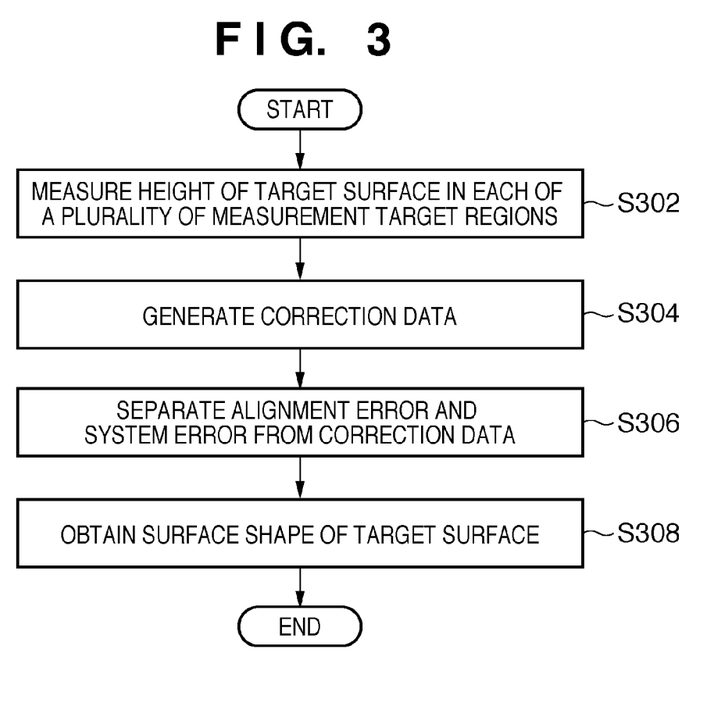
FIG. 3 is a flowchart for explaining measurement of the surface shape of a target surface TS by the measuring apparatus shown in FIG. 1.
Figure 4:
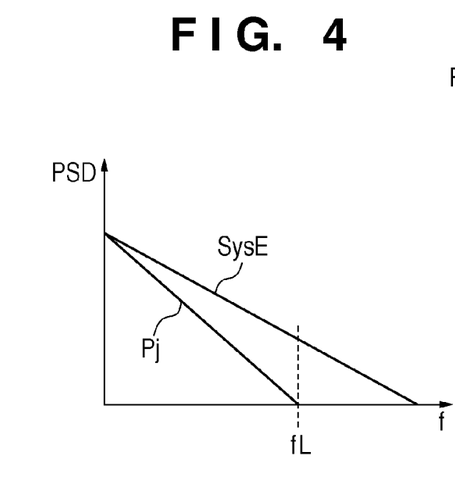
FIG. 4 is a graph schematically showing the surface shape of a target surface.
Figure 5:
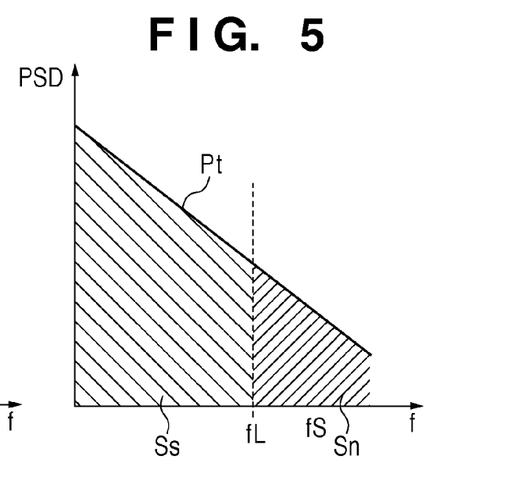
FIG. 5 is a graph schematically showing the temporary surface shape of a target surface.

For example, the surface shape of the target surface TS obtained in steps S302, S306, and S308 of FIG. 3 (that is, in the process except step S304) is defined as a temporary surface shape Pt of the target surface TS. FIG. 5 is a graph schematically showing the temporary surface shape Pt of the target surface TS. In FIG. 5, the abscissa adopts the spatial frequency f, and the ordinate adopts the frequency component PSD of the temporary surface shape Pt of the target surface TS. Let Ss be the sum of the frequency components PSD of the temporary surface shape Pt lower than the cutoff frequency fL, and Sn be the sum of the frequency components PSD of the temporary surface shape Pt higher than the cutoff frequency fL.

The cutoff frequency fL is determined so as to satisfy $X \geq Sn/Ss$, where X is the ratio of the measurement target value of the surface shape of the target surface TS to the shape error of the target surface TS, and is generally 1/5 or less. The cutoff frequency fL may be determined so as to satisfy $Y \geq Sn$, where Y is the ratio of the target measurement precision of the target surface TS. If the target surface TS is a precise optical plane, the target measurement precision Y is 10 nm or less. Note that FIG. 5 assumes only a one-dimensional frequency component as the surface shape of the target surface TS. In actuality, the cutoff frequency of the low-pass filter processing is two-dimensionally determined by obtaining two-dimensional frequency components, as described above.

That is, the third method can determine the cutoff frequency fL even if there is no information about the target surface TS, unlike the above-described first and second methods.

Figure 6:
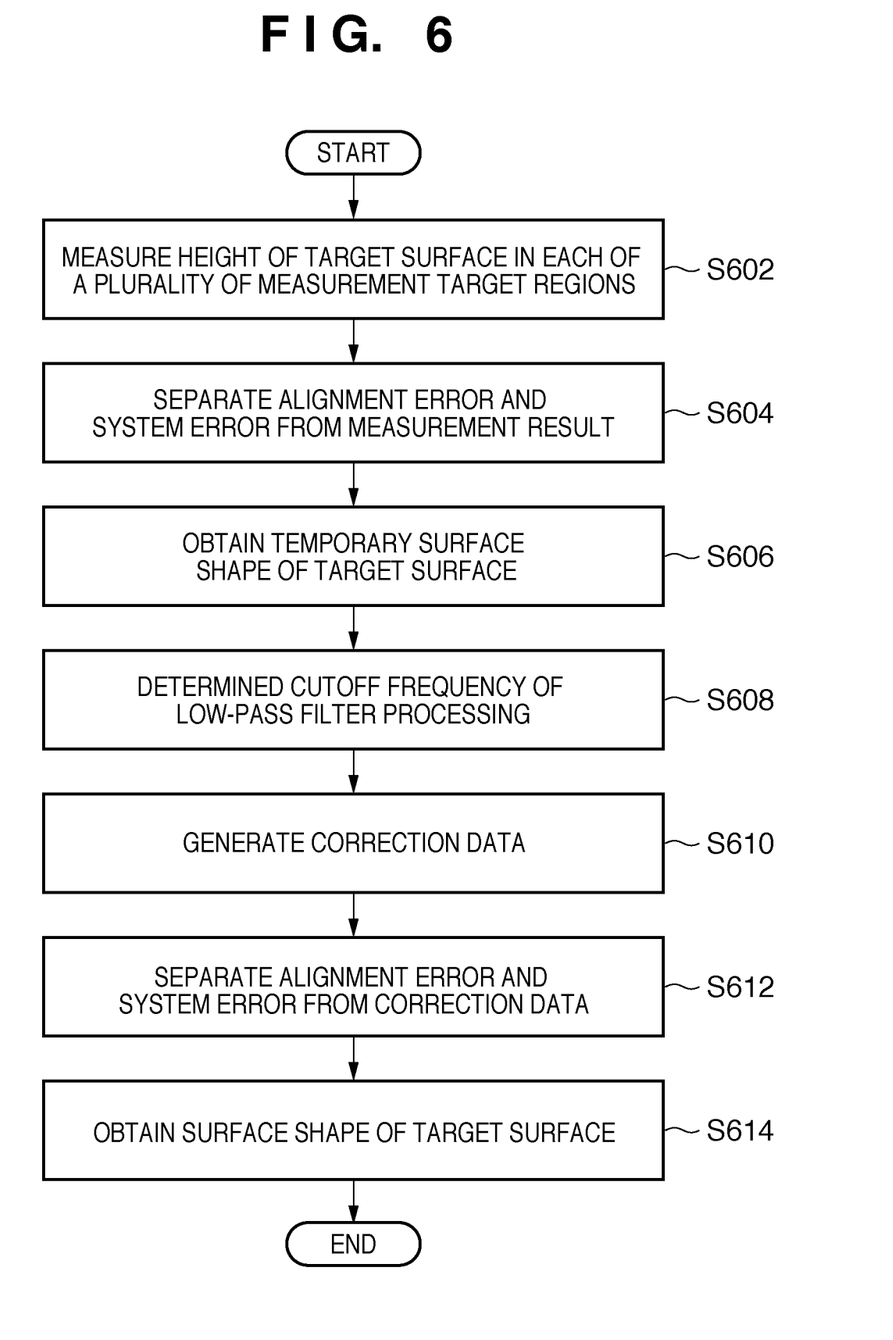
FIG. 6 is a flowchart for explaining measurement of the surface shape of the target surface TS by the measuring apparatus shown in FIG. 1.

FIG. 6 is a flowchart for explaining measurement of the surface shape of the target surface TS by the measuring apparatus 1 using the above-described third method. Note that processing of the processing unit 120, that is, processing for obtaining the surface shape of the target surface TS based on the measurement result in each measurement target region will now be described here in detail.

In step S602, the height of the target surface TS in each of the plurality of measurement target regions is measured, as in step S302. Data that give heights at a plurality of positions in the measurement target regions TSa1 to TSa8 are thus obtained as measurement results in the measurement target regions TSa1 to TSa8.

In step S604, the alignment error and system error are separated from the measurement result in each measurement target region (the data obtained in step S602). Details of the processing are the same as in step S306, and a detailed description thereof will not be repeated. However, the maximum degree of polynomials for expressing the system error of the measuring apparatus 1 is set to be maximized within the restrictions on the calculation time and the memory capacity of the computer.

In step S606, the measurement results in the measurement target regions from which the alignment errors and system errors are separated (the data generated in step S604) are combined to obtain the temporary surface shape of the target surface TS. Details of the processing are the same as in step S308, and a detailed description thereof will not be repeated. That is, in steps S604 and S606, the temporary surface shape of the target surface TS is obtained by the stitching method using the measurement results in the measurement target regions (the data obtained in step S602).

In step S608, the cutoff frequency fL of the low-pass filter processing is determined based on the temporary surface shape of the target surface TS obtained in step S606. The detailed method of determining the cutoff frequency fL of the low-pass filter processing is the same as described above.

In step S610, correction data is generated by performing low-pass filter processing with the cutoff frequency fL determined in step S608 for the measurement results in the measurement target regions TSa1 to TSa8 (the data obtained in step S602).

In steps S612 and S614, using the correction data for each of the plurality of measurement target regions generated in step S610 in place of the measurement result in each measurement target region (the data obtained in step S602), the surface shape of the target surface TS is obtained by the stitching method. Details of the processing in steps S612 and S614 are the same as in steps S306 and S308, and a detailed description thereof will not be repeated.

Figure 7A:
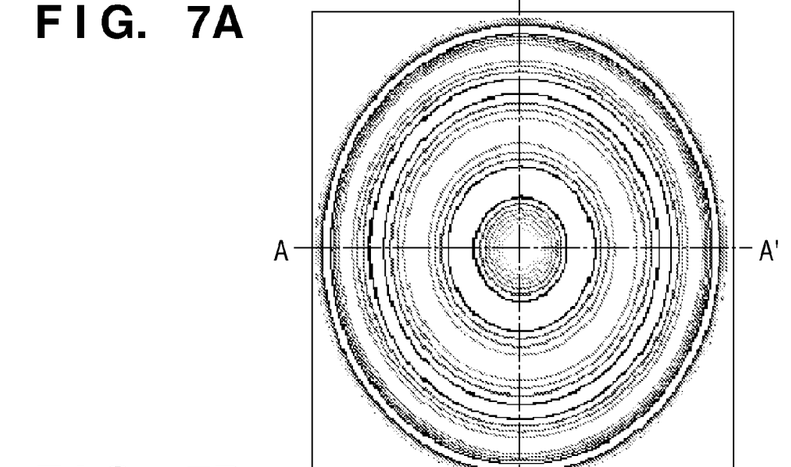
FIGS. 7A and 7B are views showing an example of the system error of the measuring apparatus shown in FIG. 1.
Figure 7B:
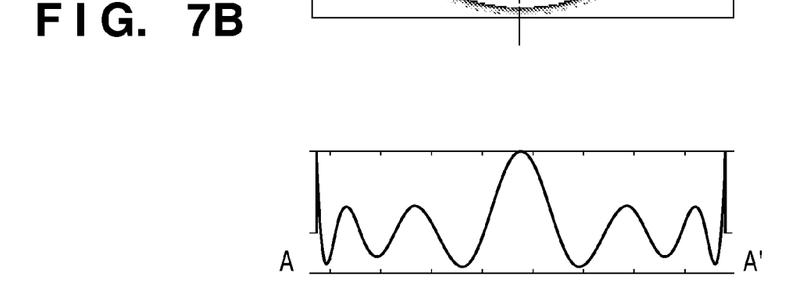

An effect obtained by causing the measuring apparatus 1 to measure the surface shape of the target surface TS will be described below with reference to FIGS. 7A, 7B, and 8. FIGS. 7A and 7B are views showing an example of the system error of the measuring apparatus 1. More specifically, FIG. 7A shows the contour lines of a system error. FIG. 7B shows the magnitude of the system error on a section taken along a line A-A' in FIG. 7A. In this embodiment, the system error of the measuring apparatus 1 is assumed to include only the 49th term of Zernike polynomials. Note that Fringe Zernike polynomials are used as the Zernike polynomials. Referring to FIGS. 7A and 7B, the maximum value of the system error is 1, and the PV value is about 1.4.

Figure 8:
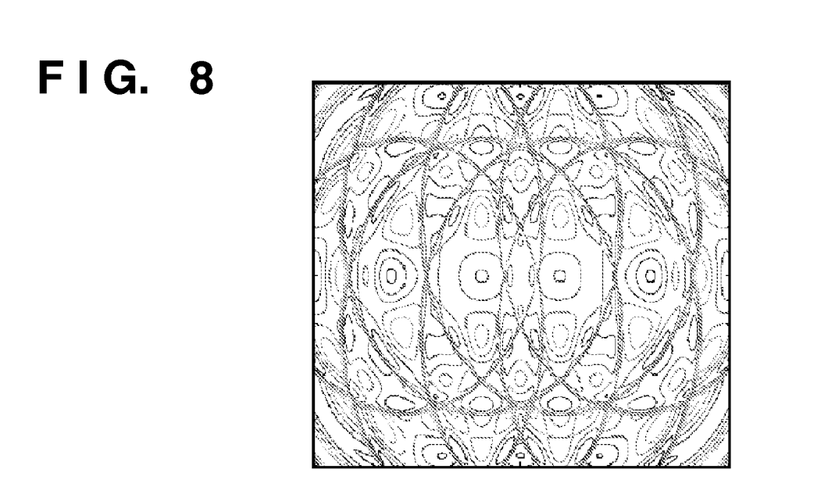
FIG. 8 is a view showing measurement errors generated when the surface shape of a target surface is measured using a conventional stitching method.

FIG. 8 is a view showing measurement errors when a measuring apparatus including the system error shown in FIGS. 7A and 7B measures the surface shape of the target surface TS using the stitching method. As is apparent from FIG. 8, the PV value of the measurement error is about 1.25, and errors corresponding to the period of the measurement target regions shown in FIG. 2 are generated. Note that in FIG. 8, the maximum degree of polynomials for expressing the system error is 48 of Zernike polynomials. For this reason, the 49th and subsequent terms of Zernike polynomials included in the system error cannot be corrected, and measurement errors shown in FIG. 8 are generated.

On the other hand, assuming that the surface shape of the measurement target regions is expressed by the 48th and lower-order terms of Zernike polynomials, the measuring apparatus 1 of this embodiment generates correction data by performing low-pass filter processing with a cutoff frequency lower than a frequency corresponding to the 48th term (maximum degree). The system error is expressed such that the maximum degree becomes greater than or equal to the 48th term of the Zernike polynomials, and the surface shape of the target surface TS is obtained by the stitching method using the correction data. Hence, the measuring apparatus 1 of this embodiment can accurately obtain the surface shape of the target surface TS.

In this embodiment, the alignment error and system error are taken into consideration in step S306. However, the present invention is not limited to this. For example, the positional error of a measurement target region or the magnification error and distortion error of the measuring apparatus 1 (measuring unit 100) can also be taken into consideration.

In step S306, the fitting parameters of errors (alignment error and system error) are selected so as to express a frequency band higher than the cutoff frequency of the low-pass filter processing in step S304. This enables accurate separation of each error from the measurement results in the measurement target regions.

Figure 9:
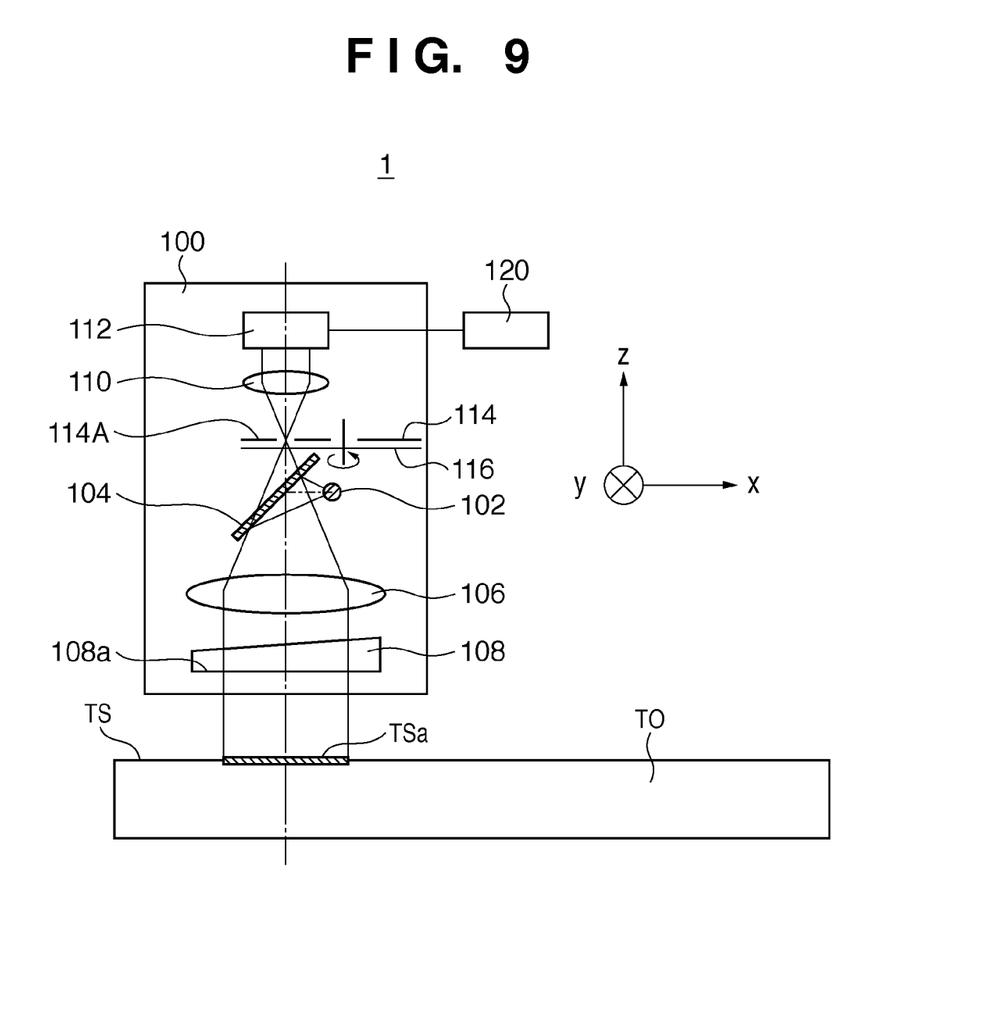
FIG. 9 is a view showing the arrangement of a measuring apparatus according to another aspect of the present invention.

Note that instead of performing low-pass filter processing for the measurement results in the measurement target regions (data that give heights at a plurality of positions in the measurement target regions), an optical low-pass filter may be implemented by an aperture filter 114A, as shown in FIG. 9.

The aperture filter 114A is arranged at a position where it can optically have a Fourier transform relationship to the target surface TS (that is, at the pupil position of the optical system that makes the target surface TS and the image sensor 112 conjugate to each other) so to be exchangeable with the aperture filter 114 via a driving mechanism 116 such as a turret. The aperture filter 114A has the function of an optical low-pass filter so as to pass light components less than or equal to a spatial frequency component determined by the diameter of the aperture of the aperture filter 114A and shield the remaining light components.

The diameter of the aperture of the aperture filter 114A is set to pass only light components of frequencies including information (height information) concerning the target surface necessary in the measurement target regions. For example, the diameter of the aperture of the aperture filter 114A is set to remove height information of frequencies higher than a specific frequency from the height information included in the data that give heights at a plurality of positions in the measurement target regions. In other words, the diameter of the aperture of the aperture filter 114A is determined so as to attain the function of the cutoff frequency of the above-described low-pass filter processing. Note that as the mechanism for changing the aperture of the aperture filter 114A, a variable mechanism for changing the aperture may be provided. Alternatively, an exchange mechanism for exchanging a plurality of aperture filters 114A having different aperture diameters may be provided.

Measurement of the surface shape of the target surface TS by the measuring apparatus 1 shown in FIG. 9 will now be described. First, the height of the target surface TS in each of the plurality of measurement target regions is measured, as in step S302. Data that give heights at a plurality of positions in the measurement target regions are thus obtained as measurement results in the measurement target regions. However, since the aperture filter 114A makes the data equivalent to the correction data (the correction data generated in step S304) that has undergone the low-pass filter processing, no low-pass filter processing needs to be performed. Using the measurement result in each measurement target region, the surface shape of the target surface TS is obtained by the stitching method.

As described above, even when an optical low-pass filter is realized by the aperture filter 114A, the surface shape of the target surface TS can accurately be obtained. Note that FIG. 9 illustrates an arrangement for exchanging the aperture filter 114 with the aperture filter 114A. However, the aperture filter 114 may be designed so as to allow changing of the aperture so that the function of the aperture filter 114A is realized by changing the aperture of the aperture filter 114.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2009-259309 filed on Nov. 12, 2009, and No. 2010-242653 filed on Oct. 28, 2010, which are hereby incorporated by reference herein in their entirety.

What is claimed is:

1. A method of measuring a shape of a surface of an optical element, the method comprising:
   a measuring step of measuring, using a measuring device, a shape for each of a plurality of regions on the surface by a surface height measurement at each of a plurality of positions in each of the plurality of regions to obtain shape data for each of the plurality of regions, each of the plurality of regions having a region overlapping another of the plurality of regions;
   an error obtaining step of obtaining an error of the surface height measurements for each of the plurality of regions so as to minimize a difference in shape with respect to each of the overlapping regions based on the shape data obtained in the measuring step for each of the plurality of regions; and
   a correcting step of correcting the shape data obtained in the measuring step for each of the plurality of regions using the error obtained in the error obtaining step for each of the plurality of regions to obtain the shape, wherein the measuring step obtains, for obtaining the error, the shape data for each of the plurality of regions so as not to include a component having a spatial frequency higher than a spatial frequency corresponding to a maximum degree of a first polynomial representing the error.

2. The method according to claim 1, wherein the measuring device includes an interferometer.

3. The method according to claim 2, wherein:
the interferometer includes a low-pass filter, and
the shape is measured the shape is measured using the low-pass filter to filter the shape data obtained by the interferometer.

4. The method according to claim 3, further comprising a cutoff frequency determining step of determining a cutoff frequency of the low-pass filter.

5. The method according to claim 4, wherein:
the shape data, to be filtered by the low-pass filter, is expressed by a second polynomial, and
a spatial frequency corresponding to a maximum degree of the second polynomial is not lower than the cutoff frequency.

6. The method according to claim 4, wherein the cutoff frequency determining step:
obtains a temporary shape of the surface based on data obtained without causing the low-pass filter to filter shape data obtained using the interferometer; and
determines the cutoff frequency based on a spatial frequency component of the obtained temporary shape.

7. The method according to claim 2, wherein:
the interferometer includes an optical low-pass filter, and
the shape is measured via the optical low-pass filter.

8. The method according to claim 1, wherein the measuring device includes a Fizeau interferometer.

9. The method according to claim 1, wherein the optical element includes a mirror or lens.

10. An apparatus for measuring a shape of a surface of an optical element, the apparatus comprising:
a measuring device configured to measure a shape for each of a plurality of regions on the surface by a surface height measurement at each of a plurality of positions in each of the plurality of regions to obtain shape data for each of the plurality of regions, each of the plurality of regions having a region overlapping another of the plurality of regions; and
a processor configured to execute:
an error obtaining process that obtains an error of the surface height measurements for each of the plurality of regions so as to minimize a difference in shape with respect to each of the overlapping regions based on the shape data obtained by the measuring device for each of the plurality of regions; and
a correcting process that corrects the shape data obtained by the measuring device for each of the plurality of regions using the error obtained by the error obtaining process for each of the plurality of regions to obtain the shape,
wherein the measuring device is configured to obtain, for obtaining the error, the shape data for each of the plurality of regions so as not to include a component having a spatial frequency higher than a spatial frequency corresponding to a maximum degree of a first polynomial representing the error.

11. The apparatus according to claim 10, wherein the measuring device includes an interferometer.

12. The apparatus according to claim 11, wherein:
the measuring device includes a low-pass filter, and
the shape is measured using the low-pass filter to filter shape data obtained by the interferometer.

13. The apparatus according to claim 12, wherein the processor is configured to execute a cutoff frequency determining process that determines a cutoff frequency of the low-pass filter.

14. The apparatus according to claim 13, wherein:
the shape data, to be filtered by the low-pass filter, is expressed by a second polynomial, and
a spatial frequency corresponding to a maximum degree of the second polynomial is not lower than the cutoff frequency.

15. The apparatus according to claim 13, wherein the cutoff determining process:
obtains a temporary shape of the surface based on data obtained without causing the low-pass filter to filter shape data obtained using the interferometer; and
determines the cutoff frequency based on a spatial frequency component of the obtained temporary shape.

16. The apparatus according to claim 11, wherein:
the interferometer includes an optical low-pass filter, and
the shape is measured via the optical low-pass filter.

17. The apparatus according to claim 10, wherein the measuring device includes a Fizeau interferometer.

18. The apparatus according to claim 10, wherein the optical element includes a mirror or lens.

19. A method of measuring a shape of a surface of an object, the method comprising:
a measuring step of measuring, using a measuring device, a shape for each of a plurality of regions on the surface by a surface height measurement at each of a plurality of positions in each of the plurality of regions to obtain shape data for each of the plurality of regions, each of the plurality of regions having a region overlapping another of the plurality of regions;
an error obtaining step of obtaining an error of the surface height measurements for each of the plurality of regions so as to minimize a difference in shape with respect to each of the overlapping regions based on the shape data obtained in the measuring step for each of the plurality of regions; and
a correcting step of correcting the shape data obtained in the measuring step for each of the plurality of regions using the error obtained in the error obtaining step for each of the plurality of regions to obtain the shape,
wherein measuring step obtains, for obtaining the error, the shape data for each of the plurality of regions so as not to include a component having a spatial frequency higher than a spatial frequency corresponding to a maximum degree of a first polynomial representing the error, and
wherein the measuring device includes a Fizeau interferometer.

20. An apparatus for measuring a shape of a surface of an object, the apparatus comprising:
a measuring device configured to measure shape for each of a plurality of regions on the surface by a surface height measurement at each of a plurality of positions in each of the plurality of regions to obtain shape data for each of the plurality of regions, each of the plurality of regions having a region overlapping another of the plurality of regions; and
a processor configured to execute:
an error obtaining process that obtains an error of the surface height measurements for each of the plurality of regions so as to minimize a difference in shape with respect to each of the overlapping regions based on the shape data obtained by the measuring device for each of the plurality of regions; and a correcting process that corrects the shape data obtained by the measuring device for each of the plurality of regions using the error obtained by the error obtaining process for each of the plurality of regions to obtain the shape, wherein the measuring device is configured to obtain, for obtaining the error, the shape data for each of the plurality of regions so as not to include a component having a spatial frequency higher than a spatial frequency corresponding to a maximum degree of a first polynomial representing the error, and wherein the measuring device includes a Fizeau interferometer.

* * * * *